(12) United States Patent
Kamepalli et al.

(10) Patent No.: US 10,276,878 B2
(45) Date of Patent: Apr. 30, 2019

(54) COATED ALUMINUM BIPOLAR PLATE FOR FUEL CELL APPLICATIONS

(71) Applicant: GM GLOBAL TECHNOLOGY OPERATIONS LLC, Detroit, MI (US)

(72) Inventors: Smuruthi Kamepalli, Rochester, MI (US); Balasubramanian Lakshmanan, Rochester Hills, MI (US); Elizabeth Dicocco, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/205,454

(22) Filed: Jul. 8, 2016

(65) Prior Publication Data

US 2018/0013153 A1 Jan. 11, 2018

(51) Int. Cl.
*H01M 8/0258* (2016.01)
*H01M 8/1007* (2016.01)
*H01M 8/1004* (2016.01)
*H01M 8/1018* (2016.01)

(52) U.S. Cl.
CPC ....... *H01M 8/0258* (2013.01); *H01M 8/1004* (2013.01); *H01M 8/1007* (2016.02); *H01M 8/1018* (2013.01)

(58) Field of Classification Search
None
See application file for complete search history.

(56) References Cited

U.S. PATENT DOCUMENTS

2012/0183887 A1* 7/2012 Iseki .............. B82Y 30/00
429/518
2013/0209917 A1* 8/2013 Himeno .......... H01M 8/0206
429/509

* cited by examiner

*Primary Examiner* — Christopher P Domone
(74) *Attorney, Agent, or Firm* — Reising Ethington P.C.

(57) ABSTRACT

A fuel cell flow field plate includes an aluminum substrate plate having a first side and a second side wherein the first side of the aluminum substrate plate defines a plurality of channels for transporting a first fuel cell reactant gas. The flow field plate also includes a first metal interlayer deposited on the first side of the aluminum substrate plate, a second metal interlayer deposited on the second side of the aluminum substrate plate, a first amorphous carbon layer deposited on the first metal interlayer, and a second amorphous carbon layer deposited on the second metal interlayer. The first amorphous carbon layer and second amorphous carbon layer each independently have a density greater than or equal to 1.2 g/cc.

18 Claims, 4 Drawing Sheets

COATED ALUMINUM BIPOLAR PLATE FOR FUEL CELL APPLICATIONS

TECHNICAL FIELD

In at least one aspect, the present invention relates to flow field plates to be incorporated into fuel cells and fuel cell stacks.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode catalyst layers of a typical PEM fuel cell are typically thin films formed by dried inks. Each electrode has finely divided catalyst particles (for example, platinum particles) supported on carbon particles to promote oxidation of hydrogen at the anode and reduction of oxygen at the cathode. Protons flow from the anode through the ionically conductive polymer membrane to the cathode where they combine with oxygen to form water which is discharged from the cell. The MEA is sandwiched between a pair of electrically conductive porous gas diffusion layers ("GDL") which, in turn, are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cells arranged in stacks in order to provide high levels of electrical power.

In some applications, it is desirable to use an inexpensive metal such as aluminum for the flow field plates. However, such aluminum substrates need to be coated due to the harsh acidic conditions that develop in PEM fuel cells. In this regard, some prior art aluminum flow field plates are still susceptible to corrosion due to the presence of non-uniformities and pinholes.

Accordingly, there is a need for aluminum flow field plates with improved corrosion resistance.

SUMMARY

In at least one embodiment, the present invention solves one or more problems of the prior art by providing a fuel cell flow field plate for fuel cell applications. The flow field plate includes an aluminum substrate plate having a first side and a second side wherein the first side of the aluminum substrate plate defines a plurality of channels for transporting a first fuel cell reactant gas. The flow field plate also includes a first metal interlayer deposited on the first side of the aluminum substrate plate, a second metal interlayer deposited on the second side of the aluminum substrate plate, a first amorphous carbon layer deposited on the first metal interlayer, and a second amorphous carbon layer deposited on the second metal interlayer. The first amorphous carbon layer and second amorphous carbon layer each independently have a density greater than or equal to 1.2 g/cc.

In another embodiment, a fuel cell that incorporates the coated flow field plate set forth is provided. The fuel cell includes an ion-conducting membrane having a cathode side and an anode side, a cathode catalyst layer disposed over the cathode side, an anode catalyst layer disposed over the anode side, a first flow field plate disposed over the cathode catalyst layer, and a second flow field plate disposed over the anode catalyst layer. At least one of the first flow field plate and the second flow field plate include an aluminum substrate plate having a first side and a second side wherein the first side of the aluminum substrate plate defines a plurality of channels for transporting a first fuel cell reactant gas, a first metal interlayer deposited on the first side of the aluminum substrate plate; a second metal interlayer deposited on the second side of the aluminum substrate plate; a first amorphous carbon layer deposited on the first metal interlayer; and a second amorphous carbon layer deposited on the second metal interlayer, the first amorphous carbon layer and second amorphous carbon layer each independently have a density greater than or equal to 1.2 g/cc.

DETAILED DESCRIPTION

Figure 1:
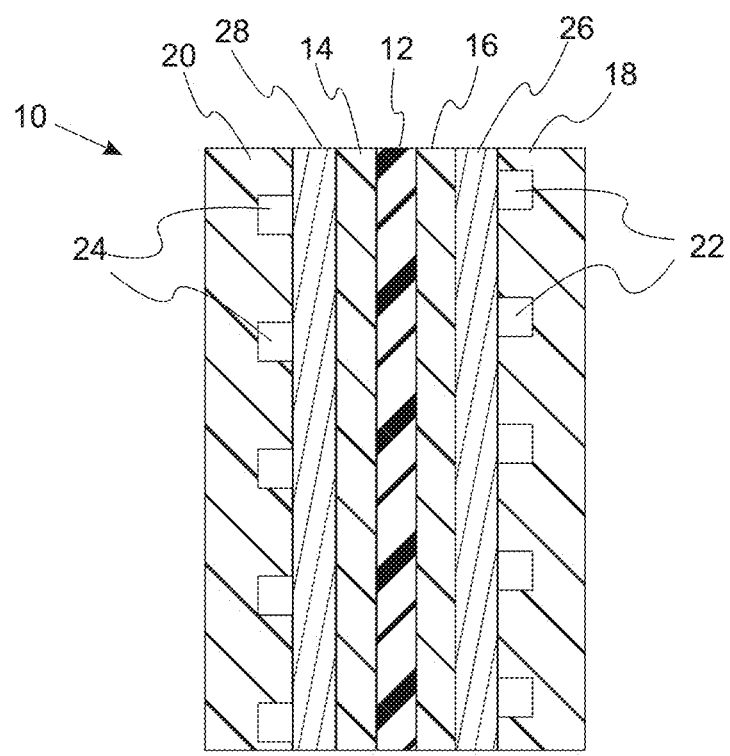
FIG. 1 provides a schematic illustration of a fuel cell incorporating a coated flow field plate.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Embodiments of the present invention provide a flow field plate for fuel cell application. The flow field plate includes an aluminum substrate which defines a plurality of channels for transporting a first fuel cell reactant gas. The flow field plate is coated on both sides (i.e., the two opposing high area sides) with a metal interlayer. The metal interlayer is overcoated with an amorphous carbon layer having density greater than or equal to 1.2 g/cc.

With reference to FIG. 1, a schematic cross section of a fuel cell that incorporates an embodiment of a coated flow field plate is provided. Proton exchange membrane (PEM) fuel cell 10 includes polymeric ion conducting membrane 12 disposed between cathode catalyst layer 14 and anode catalyst layer 16. Fuel cell 10 also includes flow field electrically conductive flow field plates 18, 20, gas channels 22 and 24, and gas diffusion layers 26 and 28. Advantageously, diffusion layers 26 and 28 are made by a variation of the process set forth below. During operation of the fuel cell 10, a fuel such as hydrogen is fed to the flow field plate 20 on the anode side and an oxidant such as oxygen is fed flow field plate 18 on the cathode side. Hydrogen ions are generated by anode catalyst layer 16 which migrate through polymeric ion conducting membrane 12 where they react at cathode catalyst layer 14 to form water. This electrochemical process generates an electric current through a load connect to flow field plates 18 and 20.

Figure 2:
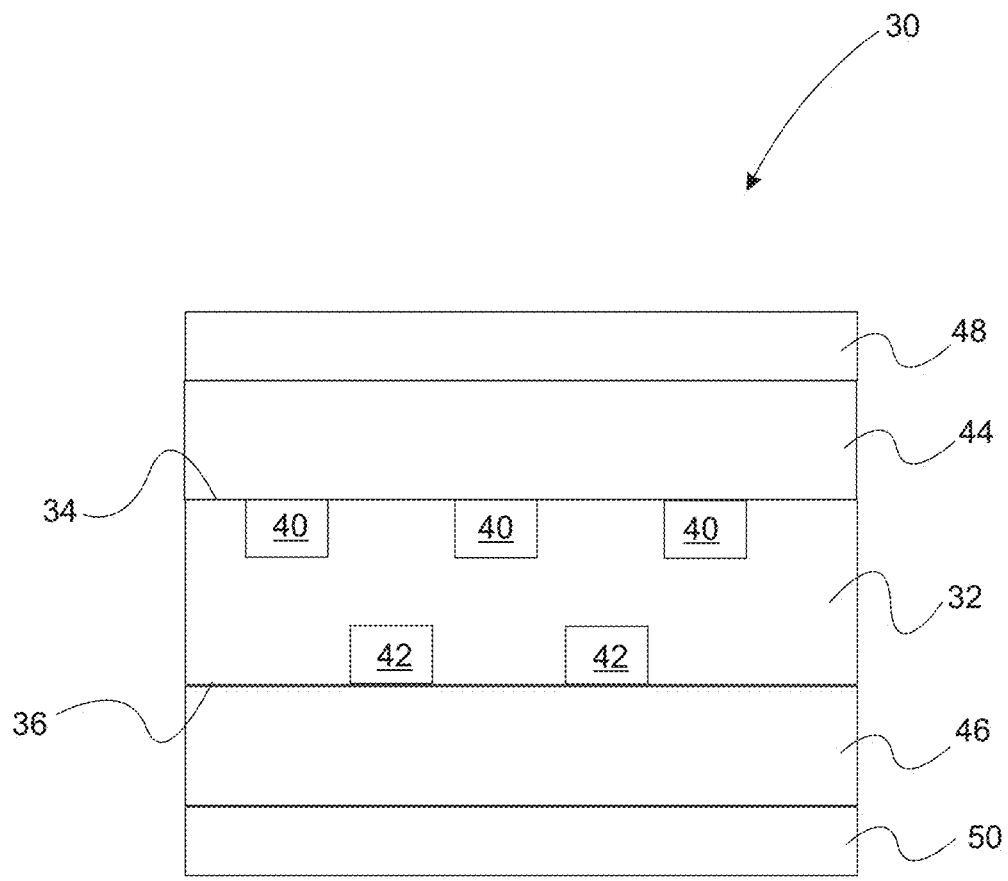
FIG. 2 provides a schematic cross section of a flow field plate to be used in the fuel cell of FIG. 1.

With reference to FIG. 2, a schematic cross section of a flow field plate to be used in the fuel cell of FIG. 1 is provided. Fuel cell flow field plate 30 includes aluminum substrate plate 32 having a first side 34 and a second side 36. First side 34 of aluminum substrate plate 32 defines a plurality of channels 40 for transporting a first fuel cell reactant gas to a fuel cell. In a refinement, second side 36 of aluminum substrate plate 32 defines a second plurality of channels 42 for transporting a second fuel cell reactant gas. In a refinement, this first fuel cell reactant gas includes a fuel such as molecular hydrogen while second fuel cell reactant gas includes oxygen (e.g., air).

Still referring to FIG. 2, fuel cell flow field plate 30 also includes first metal interlayer 44 deposited on first side 34 of aluminum substrate plate 32. Second metal interlayer 46 is deposited on second side 36 of aluminum substrate plate 32. First amorphous carbon layer 48 deposited on first metal interlayer 44 and second amorphous carbon layer 50 is deposited and contacts second metal interlayer 46.

The coated fuel cell plate of FIG. 2 exhibits improved corrosion resistance. In this regard, the first and second amorphous carbon layers have a high density. In a variation, first amorphous carbon layer 48 and second amorphous carbon layer 50 each independently have a density greater than or equal to 1.2 g/cc. In other variations, first amorphous carbon layer 48 and second amorphous carbon layer 50 each independently have a density greater than or equal, in increasing order of preference, 1.2 g/cc, 1.3 g/cc, 1.4 g/cc, 1.5 g/cc, 1.6 g/cc, 1.7 g/cc, 1.8 g/cc, 1.9 g/cc, or 2 g/cc and a density less than or equal, in increasing order of preference, 1.3 g/cc, 1.4 g/cc, 1.5 g/cc, 1.6 g/cc, 1.7 g/cc, 1.8 g/cc, 1.9 g/cc, or 2.2 g/cc. In a refinement, first amorphous carbon layer 48 and second amorphous carbon layer 50 each independently have a density from about 1.2 g/cc to about 2.2 g/cc. In another refinement, first amorphous carbon layer 48 and second amorphous carbon layer 50 each independently have a density from about 1.3 g/cc to about 2.0 g/cc. In still another refinement, first amorphous carbon layer 48 and second amorphous carbon layer 50 each independently have a density from about 1.4 g/cc to about 1.8 g/cc.

Typically, first metal interlayer 44 and second metal interlayer 46 have a thickness that is less than 200 nm. In a refinement, first metal interlayer 44 and second metal interlayer 46 have a thickness from about 10 to 50 nm. In a variation, first amorphous carbon layer 48 and second amorphous carbon layer 50 each independently have a thickness from about 30 to 100 nm. In another refinement, first amorphous carbon layer 48 and second amorphous carbon layer 50 each independently have a thickness from about 30 to 100 nm.

Characteristically, first amorphous carbon layer 48 and second amorphous layer 50 each independently have a low pinhole density that is less than about 1 pinhole per 500 $mm^2$. In a refinement, first amorphous carbon layer 48 and second amorphous carbon layer 50 each independently have a low pinhole density that is less than about 1 pinhole per 1000 $mm^2$. Typically, first amorphous carbon layer 48 and second amorphous carbon layer 50 each independently have a low pinhole density that is greater than about 1 pinhole per 10,0000 $mm^2$.

Referring to FIG. 2, fuel cell flow field plate 30 includes first metal interlayer 44 and second metal interlayer 46 which are independently metal layers. In a variation, first metal interlayer and the second metal interlayer are each independently Ni or Cr. In a refinement, first metal interlayer 44 and second metal interlayer 46 each independently have a thickness from about 10 to 50 nm.

Table 1 lists the criteria that a coating system on a flow field plate should meet in order to function properly in fuel cell application. The contact resistance and the change in contact resistance over time when the flow field plate might be exposed to a corrosive environment are properties of particular significance. The initial contact resistance (i.e., as deposited before operation in a fuel cell or before exposure to corrosion) of the flow field plate set forth above is found to be less than 20 mΩ cm² at an applied pressure of 200 psi. Contact resistance is determined by placing the coated flow field plate between two gas diffusion layers which are then surrounded by metal plates. The contact resistance is given by:

Contact Resistance=$2R_{contact/GDL}+2R_{GDL}+2R_{GDL/Plate}+R_{plate}$ where:

$R_{contact/GDL}$ is the contact resistance between a gas diffusion layer and the outer metal plates;

$2R_{GDL}$ is the electrical resistance through the gas diffusion layer;

$R_{GDL/Plate}$ is the contact resistance between a gas diffusion layer and the flow field plate substrate; and $R_{plate}$ is the electrical resistance through the flow field plate substrate. In some variations, the initial contact resistance is less than, in increasing order of preference, 20 mΩ cm² at 200 psi applied pressure, 50 mΩ cm² at 200 psi applied pressure, 40 mΩ cm² at 200 psi applied pressure, 30 mΩ cm² at 200 psi applied pressure, 20 mΩ cm² at 200 psi applied pressure, or 150 mΩ cm² at 200 psi applied pressure. In a refinement, the initial contact resistance is greater than, in increasing order of preference, 0.5 mΩ cm² at 200 psi applied pressure, 1 mΩ cm² at 200 psi applied pressure, 2 mΩ cm² at 200 psi applied pressure, 3 mΩ cm² at 200 psi applied pressure, 4 mΩ cm² at 200 psi applied pressure, or 5 mΩ cm² at 200 psi applied pressure. Advantageously, the initial change in the contact resistance (ΔCR) of the flow field plate set forth above is found to be equal to or less than 5 mΩ cm² at 200 psi applied pressure. In some variations, the initial change in the contact resistance of the flow field plate set forth above is found to be equal to or less than, in increasing order of preference, 10 mΩ cm² at 200 psi applied pressure, 7 mΩ cm² at 200 psi applied pressure, 5 mΩ cm² at 200 psi applied pressure, or 3 mΩ cm² at 200 psi applied pressure. In some variations, the initial change in the contact resistance of the flow field plate set forth above is found to be equal to or greater than, in increasing order of preference, 0.1 mΩ cm² at 200 psi applied pressure, 0.2 mΩ cm² at 200 psi applied pressure, 0.5 mΩ cm² at 200 psi applied pressure, or 1 mΩ cm² at 200 psi applied pressure. Moreover, the intermetallic and amorphous silicon coatings of the coated flow field plate are found to adhere well to the substrate passing the peel test of ASTM D3359.

TABLE I

| Criteria coating selection: | | |
| --- | --- | --- |
| Property | Requirement | Protocol |
| Initial Contact Resistance* | <20 mΩ cm² @200 psi | Through plane resistance of 2 gas diffusion layers and flat coated plate. Contact Resistance = $2R_{contact/GDL}$ + $2R_{GDL}$ + $2R_{GDL/Plate}$ + $R_{plate}$ |
| Aged Contact Resistance Post ex-situ potentiostatic durability | ΔCR ≤5 mΩ cm² @ 200 psi | Post Ex-situ potentiostatic durability (>24 hrs, 80° C., pH 3, 0.1 ppm HF, 0.5M Na2SO4, 0.8 V vs.. NHE, aerated) Same as initial CR measurement |
| Corrosion Resistance Anode* | <1 µA/cm² | Peak active current in potentiodynamic test 1 mV/s, −0.4-0.6 V vs. Ag/AgCl, pH 3, 0.1 ppm HF, 80° C., deaerated with $N_2$ |
| Corrosion Resistance Cathode* | <50 nA/cm² | Passive current in potentiostatic test 0.6 V vs. Ag/AgCl for >24 hrs pH 3, 0.1 ppm HF, 80° C., aerated solution |
| Adhesion | Pass, no coating removed. | Peel test, ASTM D3359 Tape Adhesion Test per Method B |

The following examples illustrate various embodiments of the present invention. Those skilled in the art will recognize many variations that are within the spirit of the present invention and scope of the claims.

Figure 3:
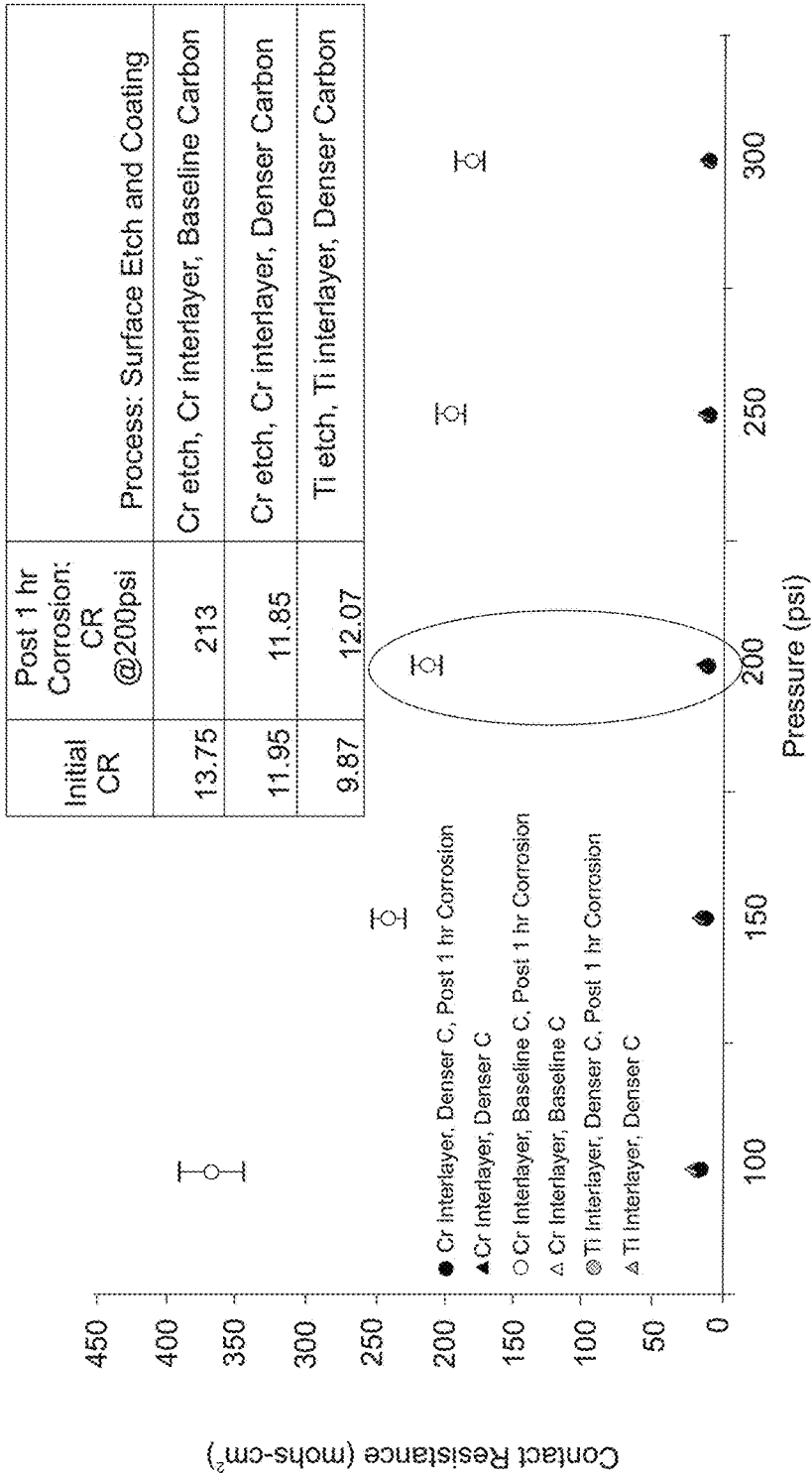
FIG. 3 provides a plot of contact resistance versus applied pressure for a coated aluminum substrate of the design of FIG. 2.
Figure 4A:
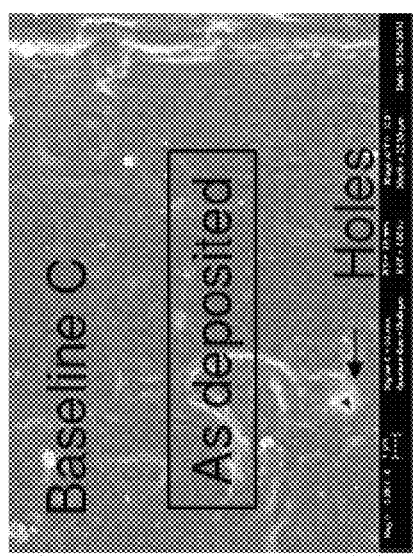
FIG. 4A provides a scanning electron micrograph of a prior art amorphous coating before corrosion.
Figure 4B:
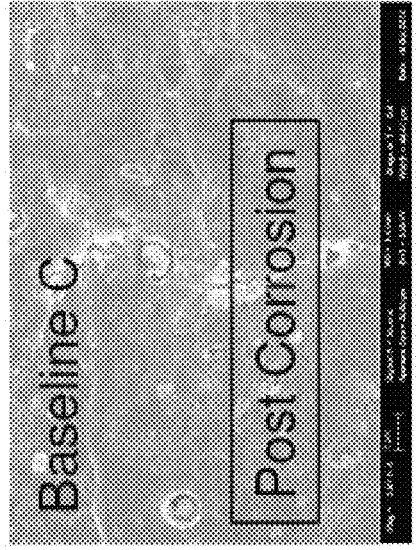
FIG. 4B provides a scanning electron micrograph of a prior art amorphous coating after corrosion.
Figure 4C:
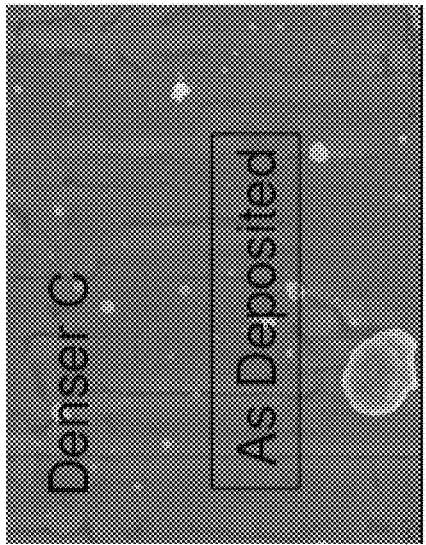
FIG. 4C provides a scanning electron micrograph of the coatings set forth in FIG. 2 before corrosion.
Figure 4D:
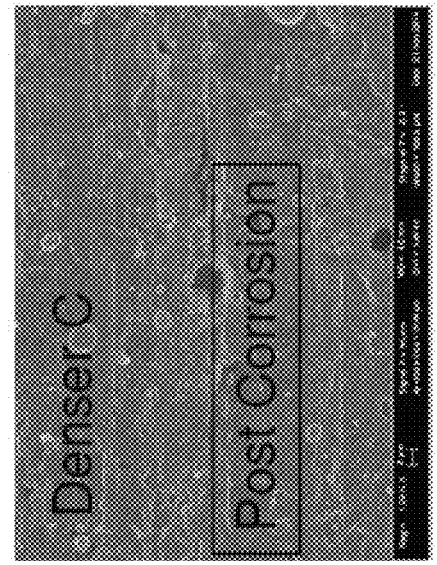
FIG. 4D provides a scanning electron micrograph of the coatings set forth in FIG. 2 after corrosion.

FIG. 3 provides a plot of contact resistance versus applied pressure for a coated aluminum substrate of the design of FIG. 2. The contact resistance is determined from the through plane resistance of 2 gas diffusion layers and a flat coated plate as set forth above. FIGS. 4A-4D provide scanning electron micrographs of coated aluminum substrates before and after exposure to a corrosive environment. Table 1 summarizes the contact resistance before and after exposure to a corrosive environment.

TABLE 2

| Contact resistances before and after exposure to corrosion | | |
| --- | --- | --- |
| Initial CR | Post 1 hr Corrosion: CR @200 psi | Process: Surface Etch and Coating |
| 13.75 | 213 | Cr etch, Cr interlayer, Baseline Carbon |
| 11.95 | 11.85 | Cr etch, Cr interlayer, Denser Carbon |
| 9.87 | 2.07 | Ti etch, Ti interlayer, Denser Carbon |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fuel cell flow field plate comprising:
an aluminum substrate plate having a first side and a second side wherein the first side of the aluminum substrate plate defines a plurality of channels for transporting a first fuel cell reactant gas;
a first metal interlayer deposited directly, on the first side of the aluminum substrate plate, the first metal interlayer consisting of Ni or Cr;
second metal interlayer deposited directly on the second side of the aluminum substrate plate, the second metal interlayer consisting of Ni or Cr;
a first amorphous carbon layer deposited on the first metal interlayer such that the first metal interlayer is disposed between the first side of the aluminum substrate plate and the first amorphous carbon layer; and
a second amorphous carbon layer deposited on the second metal interlayer such that the second metal interlayer is disposed between the second side of the aluminum substrate plate and the second amorphous carbon layer, the first amorphous carbon layer and second amorphous carbon layer each independently having a density greater than or equal to 1.2 g/cc.

2. The fuel cell flow field plate of claim 1 wherein the first amorphous carbon layer and the second amorphous carbon layer each independently have a density from about 1.2 g/cc to about 2.2 g/cc.

3. The fuel cell flow field plate of claim 1 wherein the first amorphous carbon layer and the second amorphous carbon layer each independently have a density from about 1.3 g/cc to about 2.0 g/cc.

4. The fuel cell flow field plate of claim 1 wherein the first amorphous carbon layer and the second amorphous carbon layer each independently have a density from about 1.3 g/cc to about 1.8 g/cc.

5. The fuel cell flow field plate of claim 1 wherein the first amorphous carbon layer and the second amorphous carbon layer each independently have a thickness from about 30 to 100 nm.

6. The fuel cell flow field plate of claim 1 wherein the first metal interlayer and the second metal interlayer each independently have a thickness from about 10 to 50 nm.

7. The fuel cell flow field plate of claim 1 wherein the first amorphous carbon layer and the second amorphous carbon layer each independently have a pinhole density less than about 1 pinhole per 500 $mm^2$.

8. The fuel cell flow field plate of claim 1 wherein the first amorphous carbon layer and the second amorphous carbon layer each independently have a pinhole density less than about 1 pinhole per 1000 $mm^2$.

9. The fuel cell flow field plate of claim 1 wherein the second side of the aluminum substrate plate defines a second plurality of channels for transporting a second fuel cell reactant gas.

10. A fuel cell comprising:
an ion-conducting membrane having a cathode side and an anode side;
a cathode catalyst layer disposed over the cathode side;
an anode catalyst layer disposed over the anode side;
a first flow field plate disposed over the cathode catalyst layer; and
a second flow field plate disposed over the anode catalyst layer, at least one of the first flow field plate and the second flow field plate comprising:
an aluminum substrate plate having a first side and a second side wherein the first side of the aluminum substrate plate defines a plurality of channels for transporting a first fuel cell reactant gas;
a first metal interlayer deposited directly on the first side of the aluminum substrate plate, the first metal interlayer consisting of Ni or Cr;
a second metal interlayer deposited directly on the second side of the aluminum substrate plate, the second metal interlayer consisting of Ni or Cr;
a first amorphous carbon layer deposited on the first metal interlayer such that the first metal interlayer is disposed between the first side of the aluminum substrate plate and the first amorphous carbon layer; and
a second amorphous carbon layer deposited on the second metal interlayer such that the second metal interlayer is disposed between the second side of the aluminum substrate plate and the second amorphous carbon layer, the first amorphous carbon layer and second amorphous carbon layer each independently have a density greater than or equal to 1.2 g/cc.

11. The fuel cell of claim 10 wherein the first amorphous carbon layer and the second amorphous carbon layer each independently have a density from about 1.2 g/cc to about 2.2 g/cc.

12. The fuel cell-of claim 10 wherein the first amorphous carbon layer and the second amorphous carbon layer each independently have a density from about 1.3 g/cc to about 1.3 g/cc.

13. The fuel cell of claim 10 wherein the first amorphous carbon layer and the second amorphous carbon layer each independently have a thickness from about 30 to 100 nm.

14. The fuel cell of claim 10 wherein the first metal interlayer and the second metal interlayer each independently have a thickness from about 10 to 50 nm.

15. The fuel cell of claim 10 wherein the first amorphous carbon layer and the second amorphous carbon layer each independently have a pinhole density less than about 1 pinhole per 500 $mm^2$.

16. The fuel cell of claim 10 wherein the first amorphous carbon layer and the second amorphous carbon layer each independently have a pinhole density less than about 1 pinhole per 1000 $mm^2$.

17. The fuel cell of claim 10 wherein the second side of the aluminum substrate plate defines a second plurality of channels for transporting a second fuel cell reactant gas.

18. The fuel cell of claim 10 further comprising a first gas diffusion layer interposed between the first flow field plate and the cathode catalyst layer and a second gas diffusion layer interposed between the second flow field plate and the anode catalyst layer.

* * * * *